May 12, 1970  H. R. TURNER  3,511,534
SEAT MECHANISMS

Filed Jan. 23, 1968  3 Sheets-Sheet 1

INVENTOR:
HAROLD ROY TURNER
BY Kurt Kelman
AGENT

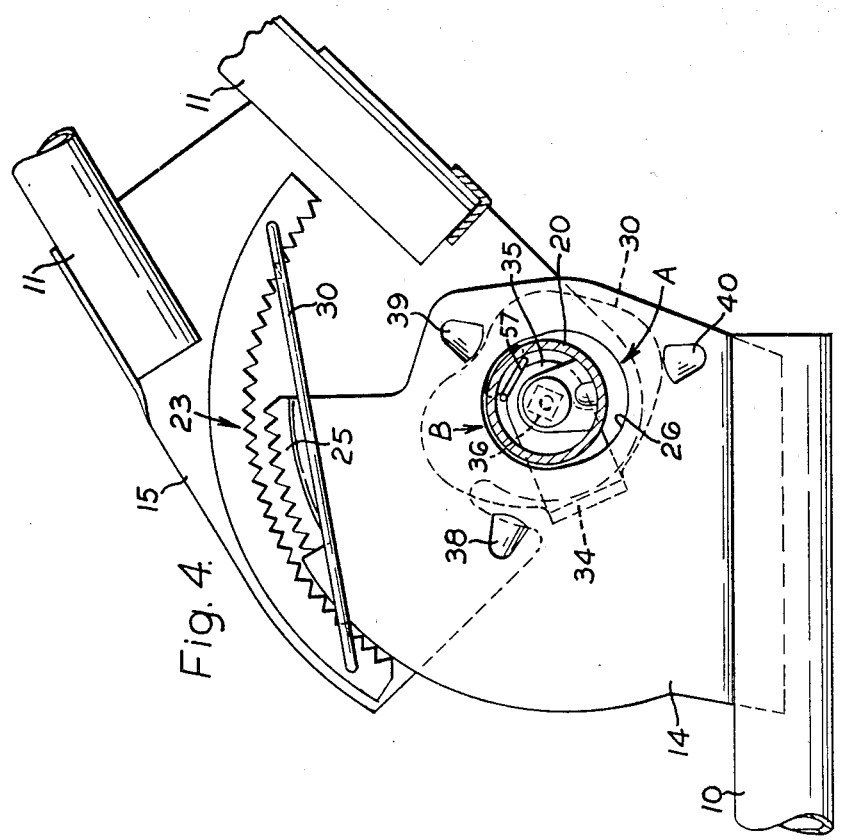
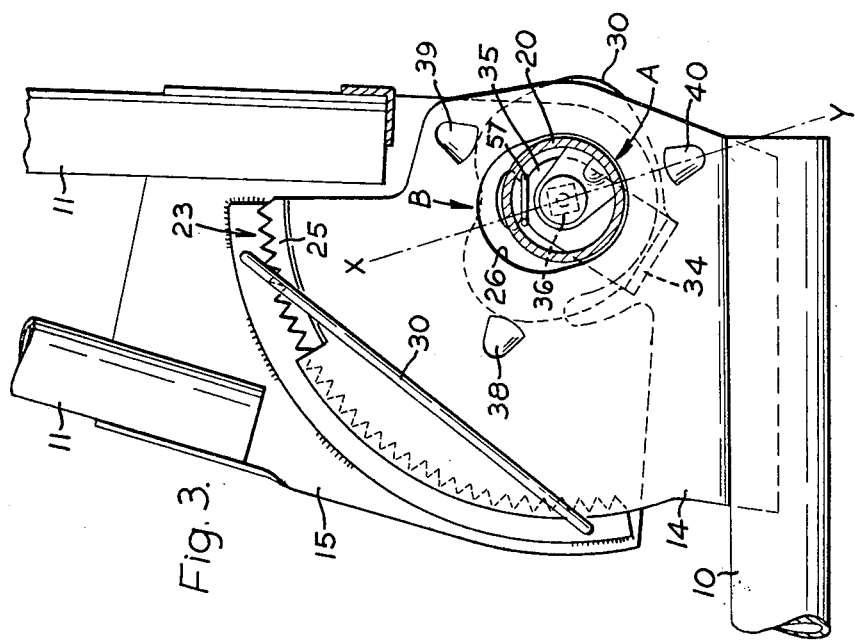

United States Patent Office 3,511,534
Patented May 12, 1970

3,511,534
SEAT MECHANISMS
Harold Roy Turner, Walsall, England, assignor to H. R. Turner (Willenhall) Limited, Willenhall, England, a British company
Filed Jan. 23, 1968, Ser. No. 699,902
Claims priority, application Great Britain, Apr. 13, 1967, 16,930
Int. Cl. B60n 1/06
U.S. Cl. 297—373                    2 Claims

ABSTRACT OF THE DISCLOSURE

The invention provides a mechanism for adjusting the angle of the seat back to the seat base in which toothed members are provided on parts secured to the seat back and seat base, and in disengaging the teeth for angular adjustment the one plate is lifted bodily with respect to the other plate to take the teeth out of mesh.

This invention relates to seat mechanisms of the well-known kind wherein the angle of the back-rest or squab may be adjusted relative to the seat cushion.

The objects of the present invention are to provide an improved mechanism and particularly, although not exclusively, one in which one set of mechanism may be provided at one side of the seat and which will serve, alone, to hold the seat at the desired angle adjustment position, with the whole of the seat back being rendered rigid. This is in distinction to the conventional practice in which a pair of mechanisms are provided, one at each side of the seat and are linked together. Although single sided mechanisms have been proposed and even used hitherto, they have been thought to be unsatisfactory because of possible movement at the top of the back rest on the side opposite to that having the mechanism due to lack of rigidity.

In accordance with the present invention a seat mechanism comprises a pair of parts adapted to be secured to the seat and back rest respectively, and pivoted together for angular adjustment, each of the parts being provided with a set of immovable or integral teeth, and one of the parts being provided with an elongated slot about the pivot axis and being journalled on a tube extending across the seat and the other of the parts being fast with said tube at least radially thereof, the two sets of teeth being meshed when the said one part and slot are in one position relative to the tube, and being taken out of mesh by relative movement between the tube and slot.

The mechanism may comprise three parts, namely the two parts provided with teeth and a cam journalled on the tube and possibly lying between the two parts, and being adapted for abutment with a number of fixed stops provided on the slotted part. Preferably three such stops are provided which may be equi-spaced about the axis of the tube.

The tube may house a pair of springs namely a generally U-shaped torsion bar spring which provides a resilient force urging the seat back forwardly, and a comparatively short helical spring which may be hook-engaged with the torsion bar spring and with the cam and which serves to urge the cam to a position in which the toothed members are meshed.

One preferred embodiment of the invention is now more particularly described by way of example only and with reference to the accompanying drawings wherein:

FIGS. 3 and 4 are side elevations showing parts in two different positions.

Figure 1:
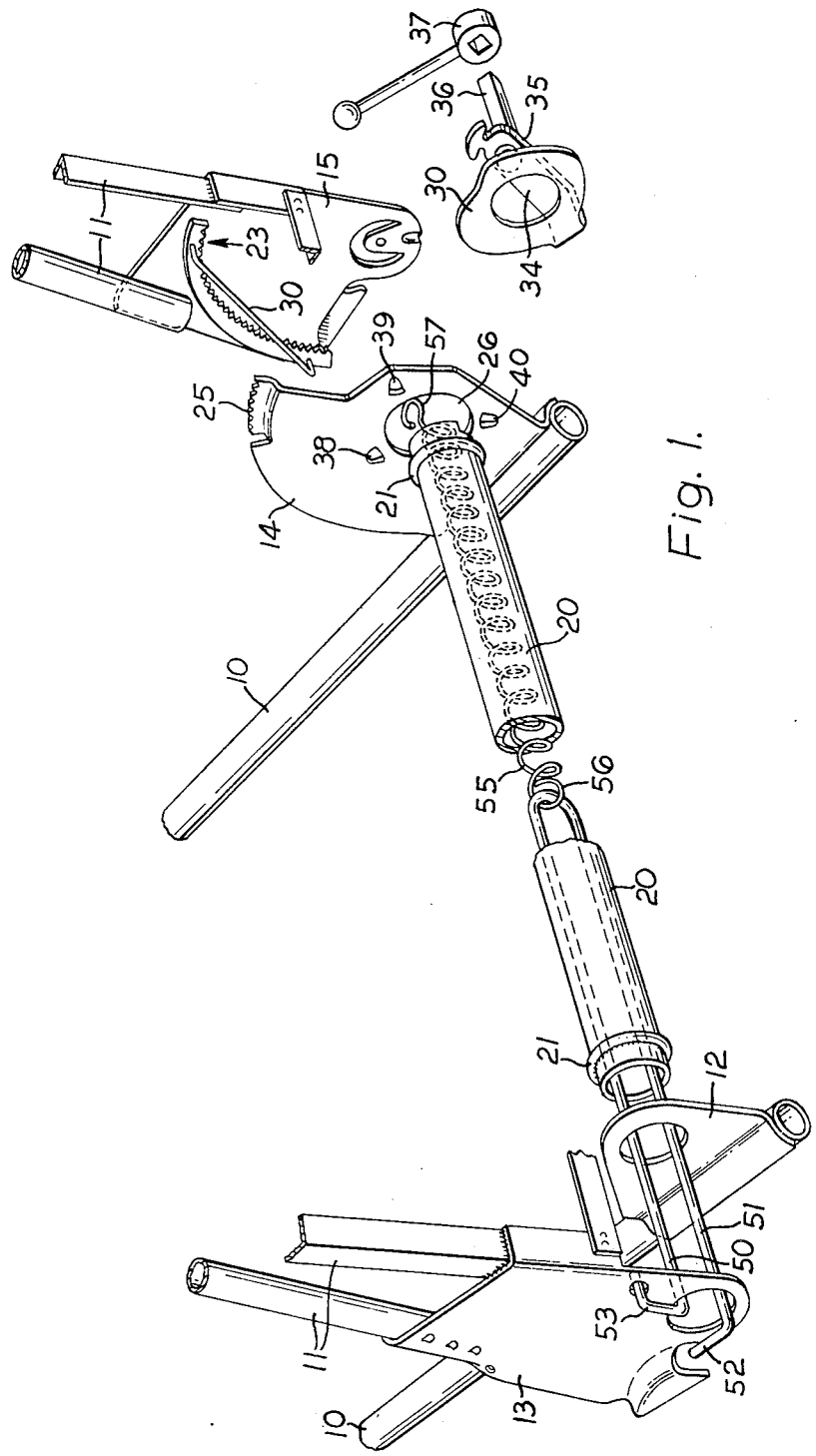
FIG. 1 is an exploded perspective view.
Figure 2:
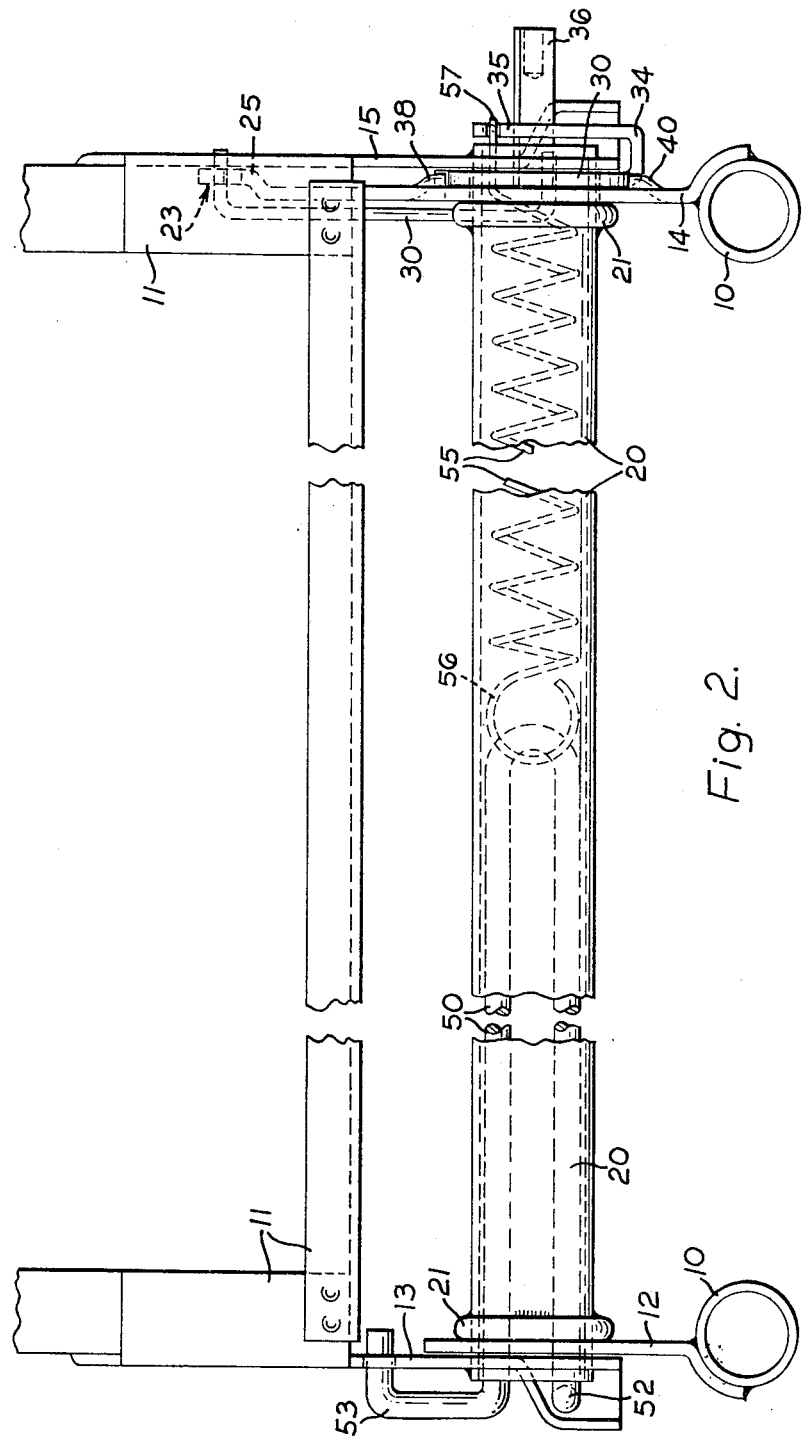
FIG. 2 is a rear elevation.

Referring now to the drawings a seat for a motor vehicle comprises a pair of frames, only parts of which are shown, namely a seat frame 10 and a back-rest frame 11 each of which is fabricated from lengths of shaped tube, metal pressings and the like welded into a rigid structure, and the lower portion of the back rest frame and the rear portion of the seat frame are provided at each side with a corresponding plate 12, 13, 14, 15 welded to the respective frame. The two plates at each side of the frames, namely one plate 12 or 14 attached to the seat frame, and one 13 or 15 attached to the back rest frame lie substantially in face-to-face contact with one plate 13 welded to the welded to the ends of a relatively large diameter tube 20 extending across the seat, and the axis of the tube is co-axial with the hinge or pivotal axis of the back rest. The plate 12 which is generally parallel and in face-to-face contact with one plate 13 welded to the tube, is journalled on the tube, and has a plain circular hole therein for this purpose, and a collar or ring 21 is passed on to the tube to abut the journalled plate on the opposite side of the latter to the welded plate, and this ring or collar 21 is also welded to the tube. This arrangement holds the plates 12, 13 in proximity in a simple and convenient manner.

In the opposite side of the seat to the plates 12, 13 the tube also extends through the two plates, and in this case also is welded to the outer one of the plates 15, namely the one attached to the back rest frame. This plate 15 is provided with an arcuate rack-like set of teeth 23 fixed to the plate and on its inner face (that is the face adjacent the centre of the seat) and these teeth are inwardly directed, that is, towards the tube. The rack may be integral with or attached to plate 15.

The second plate at this side, 14, is also provided with a set of teeth 25 and is formed with an elliptical eye or elongated hole 26 through which the tube extends. This eye allows movement of the tube in a direction radial to the axis of the tube for a distance sufficient to take the two sets of teeth 23, 25 into and out of mesh. The plate 14 is joggled at its outer periphery so as to bring the teeth 25 into the same plane as the teeth 23 on the other plate 15 and leave a space between the plates 14, 15.

In order to hold the plates in parallel relationship, one of the plates may be provided with radially extending lugs which overlie the other plate, or preferably and as illustrated the plate 15 is provided with a wire stay 30 extending parallel to the plate and welded to it at its ends so as to extend secant-wise across the plate 14.

Disposed between the two toothed plates 14, 15 is a cam 32 which is journalled on the tube 20. The assembly of two plates and cam is held together by a further ring or collar 21 provided on the tube adjacent to the plates but on the side nearest to the centre of the seat and welded to the tube.

The cam is provided with a lug 34 which extends out of the space between the two plates and is cranked to extend transversely of the edges of the plates and then terminate in a portion 35 extending across the free end of the tube and provided wtih a squared shank 36 (or with a hole) for attachment of an operating handle 37 so that the shank lies on the axis of the tube, and pivotal movement of the handle turns the cam.

The plate 14 is provided on the face adjacent the plate 15 with three substantially equi-spaced abutment lobes 38, 39, 40. These lobes are arranged so that two of them 38, 39 lie on opposite sides of a line X–Y, FIG. 3, connecting the tube axis and bisecting the set of teeth on this plate, this line also including the major axis of elliptical hole in the plate, and the said line also bisecting the third lobe 40 which lies on the opposite side of the tube axis to the said teeth.

When the teeth are meshed as in FIG. 3, and the mechanism is at rest, the tube 20 seats in one end A of the slot and the cam abuts the lobes 38, 39, the cam being held in this position by a spring as hereinafter described. Turning the lever handle stresses the spring still further, and causes the cam to engage the third lobe 40 and displace the tube bodily along the slot and within the slot, thus lifting the meshed teeth 23 on the plate 15 attached to the back rest frame 11 off the teeth 25 on the plate 14 attached to the seat frame 10. This takes the tube 20 to the FIG. 4 position at end B of the slot.

The handle will move bodily with the cam and tube, albeit through a small distance, and conveniently the arrangement is such that the pivotal direction and bodily movement direction coincide, i.e. the handle is lifted upwardly as the tube goes from end A to end B. Release of the handle causes spring-driven return of the cam, re-meshing, and re-seating of the tube in the original slot end A.

In a typical case the bodily movement of the tube will be of the order of ⅛". This movement will be accompanied by slight canting of the tube along its length since the journalling of the opposite end of the tube in plates 12, 13 does not allow of displacement at that end.

The mechanism is provided with a torsion bar spring consisting of a narrow U-shaped bar with the free ends of the legs 50, 51, of the U provided with out-turned end portions 52, 53 and the U is threaded into the tube from the plate journalled end of the latter and the respective out-turned end portions of the U are anchored to the back rest frame and seat frame (the anchorage to the latter is not shown) and the spring is pre-stressed so that the spring tends to swing the back rest frame 11 forwards and adjustment of the back rest in the opposite direction is accompanied for example by the seat occupant leaning back so as to increase the stress in the said spring. The spring extends along the length of the tube from the said journalled end towards the end connected to the toothed plates. A separate spring 55 is provided for urging the cam to a normal position in which the teeth are held in mesh and this further spring comprises a relative helical torsion spring having one end loop 56 engaged with the U-shaped torsion spring and the other end loop 57 engaged with the cam at the lug provided with the handle connection. Hence movement of the lever handle twists the further spring so as to stress the latter and this provides the restoring force which returns the cam to the normal position. This spring is also pre-stressed.

Whilst the invention has been described with respect to a seat having a toothed mechanism at one side only, thus making a so-called "single sided mechanism" substantially the same design can be duplicated at respective sides of the seat, preferably using a single lever handle which is coupled by a solid shaft or by a simple lost-motion mechanism so as to enable both mechanisms to be released and re-engaged either simultaneously, or quite independently, i.e. successively.

Moreover, in either case, i.e. the single sided or double-sided seat, the tube need not be straight; for example it may be cranked to have co-axial straight end portions and with a very shallow V or curve between its ends, preferably the curve or V extending upwardly and forwardly, so as to increase clearance behind and below the seat. This is useful in increasing space in the rear passenger compartment of a motor car.

In another modification, the handle used to release engagement does not fit directly to the cam, but is coupled thereto by a link or linkage, so as to enable the handle to be located well above or forwardly of the hinge axis, and this is useful if the vehicle has a high transmission tunnel or the like at the side of the seat.

I claim:
1. In an adjustable seat mechanism, the combination of a seat frame (10), a back rest frame (11), a pair of juxtaposed plates (14–15) provided at one side of the respective frames rigidly therewith, a fulcrum shaft (20) having one end thereof secured to one of said plates (15) and passing freely through aslot (26) formed in the other plate (14) whereby the seat frame and the back rest frame are pivotally and angularly adjustably connected together and whereby the frame (11) equipped with the plate (15) which is secured to said shaft (20) may be shifted with said shaft in the direction of elongation of said slot (26) relative to the slotted plate (14) of the other frame (10), a toothed segment (23) rigid with one of said plates (15) provided on the other plate (14) in alignment with the direction of elongation of said slot (26) so that when said shaft (20) is shifted in said slot (26) as aforesaid, said segment (23) may be engaged with and disengaged from said rack (25) to respectively lock and unlock the angularly adjustable connection of said frames (10–11), and actuating means for shifting said shaft (20) in said slot (26).

2. The mechanism as defined in claim 1 together with a second pair of juxtaposed plates (12–13) provided at the opposite side of the respective frames (10–11), the other end of said fulcrum shaft (20) being journalled in said second pair of plates (12–13) for pivotal connection of said frames (10–11) while permitting said shaft (20) to be shifted in said slot (26) as aforesaid.

References Cited
UNITED STATES PATENTS

| | | | |
|---|---|---|---|
| 1,856,534 | 5/1932 | Boery | 297—373 |
| 3,195,952 | 7/1965 | Beache et al. | 297—374 |
| 3,271,811 | 9/1966 | Floodell | 297—373 X |
| 3,309,138 | 3/1967 | Byczkowski et al. | 297—355 |
| 3,328,079 | 6/1967 | Byczkowski et al. | 297—373 |
| 3,362,747 | 1/1968 | Fuelling et al. | 297—373 |
| 3,397,912 | 8/1968 | Bush | 297—374 X |

FOREIGN PATENTS

| | | |
|---|---|---|
| 1,046,893 | 10/1966 | Great Britain. |

BOBBY R. GAY, Primary Examiner

G. O. FINCH, Assistant Examiner